US009648172B2

(12) United States Patent
Li et al.

(10) Patent No.: US 9,648,172 B2
(45) Date of Patent: May 9, 2017

(54) DEVICES FOR DETERMINING TO TERMINATE A CHARGING SESSION AND SYSTEMS THEREOF

(71) Applicant: Alcatel Lucent, Boulogne Billancourt (FR)

(72) Inventors: Xiangyang Li, Shanghai (CN); Yigang Cai, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/416,379

(22) PCT Filed: Jul. 10, 2013

(86) PCT No.: PCT/IB2013/001803
§ 371 (c)(1),
(2) Date: Jan. 22, 2015

(87) PCT Pub. No.: WO2014/016676
PCT Pub. Date: Jan. 30, 2014

(65) Prior Publication Data
US 2015/0207940 A1 Jul. 23, 2015

(30) Foreign Application Priority Data

Jul. 27, 2012 (CN) .......................... 2012 1 0264567

(51) Int. Cl.
*H04L 1/00* (2006.01)
*H04M 15/00* (2006.01)
(Continued)

(52) U.S. Cl.
CPC ........ *H04M 15/60* (2013.01); *H04L 12/1407* (2013.01); *H04L 65/1016* (2013.01);
(Continued)

(58) Field of Classification Search
CPC ......... G06F 15/16; G06F 21/00; G01R 31/08; H04L 47/10; H04L 47/11; H04L 47/12; H04L 47/13
(Continued)

(56) References Cited

U.S. PATENT DOCUMENTS

| 2011/0026466 | A1 | 2/2011 | Zhou | |
|---|---|---|---|---|
| 2013/0091281 | A1* | 4/2013 | Chai | ....................... H04L 12/14 709/225 |
| 2014/0348030 | A1* | 11/2014 | Tornkvist | ............ H04L 12/1435 370/259 |

FOREIGN PATENT DOCUMENTS

| CN | 101079832 A | 11/2007 |
|---|---|---|
| CN | 101132289 A | 2/2008 |

(Continued)

OTHER PUBLICATIONS

International Search Report for PCT/IB2013/001803 dated Dec. 10, 2013.
(Continued)

*Primary Examiner* — Dady Chery
(74) *Attorney, Agent, or Firm* — Fay Sharpe, LLP

(57) ABSTRACT

The present invention aims to provide devices for determining to terminate a charging session and Systems thereof. A session termination decision device receives a decision request for terminating a charging processing of the current always on IP connectivity session from a charging session termination request device; the session termination decision device sends information relevant to a termination rule corresponding to the charging session of the current always on IP connectivity session to the initiating device for the charging session, in response to the decision request; and the initiating device for the charging session requests the OCS to terminate the charging session. Compared with the prior art, the present invention releases a Diameter charging (Continued)

session without totally removing the charging rules from IP-CAN, and keeps the IP-CAN session when there is no active service or data flow during long duration session, i.e. the always on IP connectivity session. It will significantly save System resources and reduce unnecessary charges to end users, and thus benefit both service providers and end users.

16 Claims, 9 Drawing Sheets

(51) Int. Cl.
    *H04L 29/06* (2006.01)
    *H04L 12/14* (2006.01)
    *H04W 4/26* (2009.01)
(52) U.S. Cl.
    CPC ........... *H04M 15/57* (2013.01); *H04M 15/66* (2013.01); *H04M 15/8228* (2013.01); *H04W 4/26* (2013.01)

(58) Field of Classification Search
    USPC ......... 709/224, 225, 228; 370/259, 229, 230
    See application file for complete search history.

(56) References Cited

FOREIGN PATENT DOCUMENTS

| EP | 2 268 094 A1 | 12/2010 |
| JP | H10-224482 A | 8/1998 |
| JP | 2006-509385 A | 3/2006 |
| JP | 2010-288223 A | 12/2010 |
| WO | WO 2010/057524 A1 | 5/2010 |
| WO | 2010060457 A | 6/2010 |

OTHER PUBLICATIONS

3GPP TS 29.213 V11.3.0 (Jun. 2012); Policy and Charging Control signalling flows and Quality of Service (QoS).

* cited by examiner

DEVICES FOR DETERMINING TO TERMINATE A CHARGING SESSION AND SYSTEMS THEREOF

FIELD OF THE INVENTION

The present invention relates to the field of mobile communications technology, and more specifically, to a technique of determining to terminate a charging session.

BACKGROUND OF THE INVENTION

Long duration call (LDC) charging becomes a critical issue for IMS (IP Multimedia Subsystem) /LTE (Long Term Evolution) network. Currently the data mobile usage trend is clearly oriented towards longer IP-CAN (IP-Connectivity Access Network) sessions. The usage of smart phones and the heterogeneousness of their operating systems behavior with regards to notifications, push mode, etc. increase the number of very long sessions in telecommunication networks. In addition, the 4G LTE/EPC (Evolved Packet Core) achieves the always on IP connectivity feature and IP-CAN sessions will remain active even for months from attachment to detachment.

However, for an IP-CAN session, if the charging session is kept when there is no active service or data flow within the IP-CAN during long duration session (i.e. the always on IP connectivity session), it is a waste of resources for all charging network elements associated with the IP-CAN.

Currently, various standards and practices tie the charging Diameter session tightly with IP-CAN session, such that a closure of Diameter session will terminate the IP-CAN session at that the PCRF (Policy and Charging Rules Function) will remove all charging rules (Policy and Charging Rules, i.e. PCC rules) related to the IP-CAN session.

Therefore, the prior art cannot implement the following solution: releasing a charging Diameter session, for example, a Gy/Ro session, when there is no active service/data flow, but still keeping the IP-CAN/bearer session, so as to achieve the always on IP connectivity.

SUMMARY OF THE INVENTION

The present invention aims to provide devices for determining to terminate a charging session and system thereof.

According to one aspect of the present invention, a charging session termination decision device for determining to terminate a charging session is provided. The charging session termination decision device comprises: a request receiving module configured to receive a decision request for termination of the charging processing of the current always on IP connectivity session from a charging session termination request device; a rule sending module configured to send information relevant to a termination rule corresponding to the charging session of the current always on IP connectivity session to the initiated device of the charging session, in response to the decision request.

According to another aspect of the present invention, a first charging session termination request device for determining to terminate a charging session is provided. The first charging session termination request device comprises: a first requesting module configured to request a charging system to terminate a charging session regarding the current always on IP connectivity session, when a first predetermined termination condition regarding the charging processing is satisfied.

Preferably, the first requesting module is configured to: request the charging system to terminate the charging session based on a termination rule corresponding to the charging session, when the first predetermined termination condition regarding the charging processing is satisfied.

Further, the first requesting module comprises: a decision requesting unit for sending a decision request for terminating the charging processing of the current always on IP connectivity session to a charging session termination decision device when the first predetermined termination condition regarding the charging processing is satisfied; a rule receiving unit for receiving information relevant to a termination rule corresponding to the charging session, where the information is sent by the charging session termination decision device in response to the decision request; a termination request unit for determining a corresponding termination rule based on the information relevant to the termination rule corresponding to the charging session, so as to request the charging system to terminate the charging session.

According to a further aspect of the present invention, a second charging session termination request device for assisting in determining to terminate a charging session is provided. The second charging session termination request device comprises: a second request module configured to send a decision request for terminating the charging processing of the current always on IP connectivity session to a charging session termination decision device when a second predetermined termination condition regarding the charging processing is satisfied.

According to a still further aspect of the present invention, a third charging session termination request device for assisting in terminating a charging session is provided. The third charging session termination request device comprises: a session termination request module configured to request a charging system to terminate a charging session, based on information relevant to a termination rule corresponding to the charging session of the current always on IP connectivity session from a charging session termination decision device.

According to one aspect of the present invention, a system for determining to terminate a charging session of an always on IP connectivity session is provided. The system for determining to terminate a charging session of an always on IP connectivity session comprises the charging session termination decision device for determining to terminate a charging session according to the one aspect of the present invention, and the first charging session termination request device for determining to terminate a charging session according to the further embodiment of the another aspect of the present invention.

According to another aspect of the present invention, a system for determining to terminate a charging session of an always on IP connectivity session is provided. The system for determining to terminate a charging session of an always on IP connectivity session comprises the charging session termination decision device for determining to terminate a charging session according to the one aspect of the present invention, the second charging session termination request device for determining to terminate a charging session according to the further aspect of the present invention and the third charging session termination request device for determining to terminate a charging session according to the still further aspect of the present invention.

Compared with the prior art, the present invention releases a Diameter charging session without totally removing the charging rules from IP-CAN, and keeps the IP-CAN session when there is no active service or data flow during long duration session, i.e. the always on IP connectivity session. It will significantly save system resources and reduce unnecessary charges to end users, and thus benefit both service providers and end users.

BRIEF DESCRIPTION OF THE SEVERAL VIEWS OF THE DRAWINGS

Through reading the following detailed depiction on the non-limiting embodiments with reference to the accompanying drawings, the other features, objectives, and advantages of the present invention will become clearer.

Same or like reference numerals in the accompanying drawings indicate the same or corresponding components.

DETAILED DESCRIPTION OF THE INVENTION

Hereinafter, the present invention will be further described in detail with reference to the accompanying drawings.

3GPP has introduced Policy and Charging Control (PCC) architecture for service data flow in Packet Switched Network for a while (see 3GPP TS 23.203 (the latest version v11.5.0, March 2012)).

Figure 1:
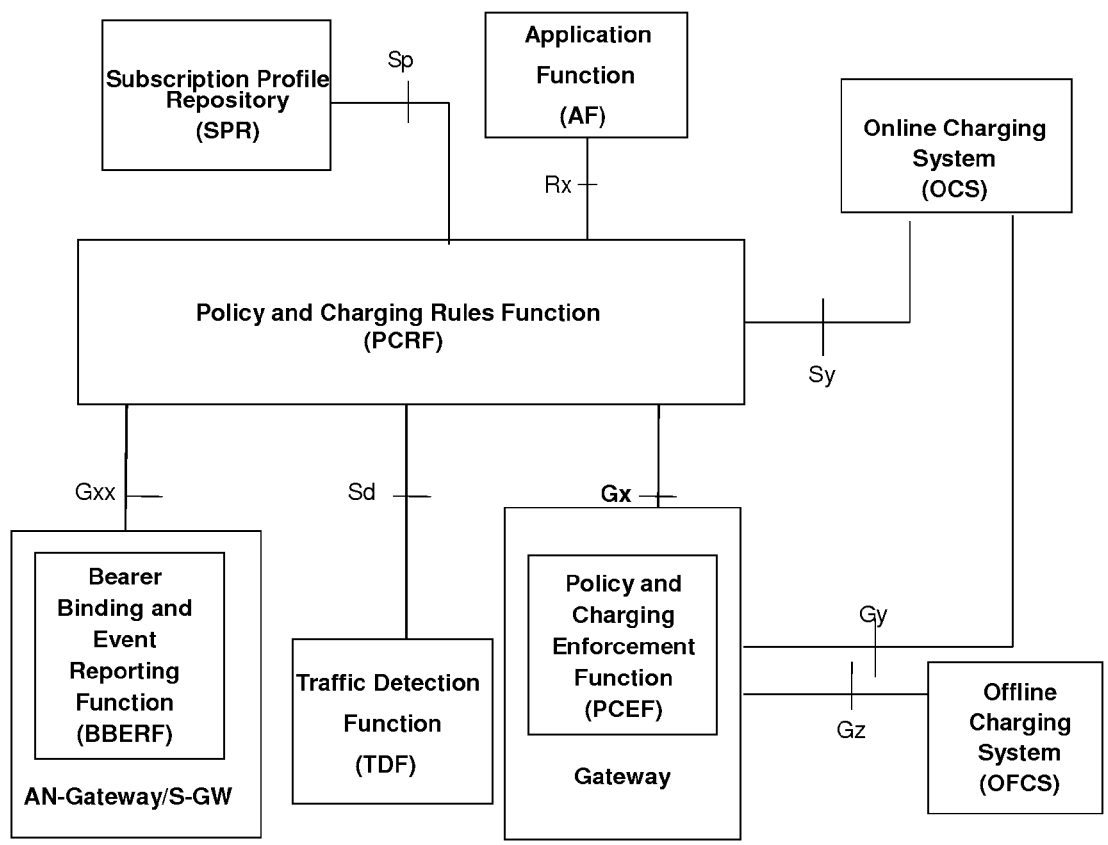
FIG. 1 shows a schematic diagram of PCC architecture.

FIG. 1 shows a schematic diagram of PCC architecture. The PCC architecture works at SDF (service data flow) level and provides functions such as policy control, charging control function, and event reporting for service data flow, which aims to provide differentiated services to subscribers and provide subscriber service flow bearer resource guarantee and flow charging policy, such that the operator achieves a more refined service control and charging manner based on service and subscriber category, thereby reasonably utilizing network resources and creating maximum profits.

Here, the main functional entities shown in FIG. 1 are depicted below:

A policy and charging rules function (PCRF) has a policy control decision and flow charging control-based function, and provides a network control function regarding service data flow detection, gate control, QoS-based and flow charging-based (excluding credit control) to the PCEF. The present invention calls a device having the policy and charging rule function as a PCEF device.

A policy and charging enforcement function (PCEF) is in charge of service data flow detection, policy enforcement, and flow-based charging function, which is generally equipped in a GGSN (gateway GPRS support node) or P-GW (packet data network gateway).

A traffic detection function (TDF) detects application traffic and reports it to the PCRF. The TDF may be an individual device or integrated with PCEF. For the convenience of depiction, the present invention regards TDF and PCEF as an integral one, and calls a device having functions of the two as a PCEF device.

An application function (AF) mainly performs dynamic policy/charging control on the IP-CAN user plane and is provided on a service platform. The present invention calls a device having the application function as an AF device.

An online charging system (OCS) is responsible for performing credit control charging to IMS and the packet bearer network and serves S-CSCF (serving call session control function) under IMS environment, application servers, multimedia resource function controllers (MRFC), and packet domain access device SGSNs (service GPRS support node) accessed by CAP (cable access point), etc.

For the convenience of depiction, the present invention takes the OCS as an example of a charging system. However, those skilled in the art should understand that the OFCS (offline charging system) likewise belongs to the charging system. In other words, the OFCS is also applicable to the present invention in a similar manner and thereby included within the protection scope of the present invention.

3GPP TS 29.214 defines Rx reference point between the PCRF and the AF, such that the AF can inform the EPC network for active service from application plane.

The 3GPP TS 29.212 defines Gx reference point between the PCRF and the PCEF, such that a network can execute charging policy in EPC traffic plane.

The 3GPP TS 29.213 provides a scenario on how to remove charging rules and release an AF session and a bearer session.

Figure 2:
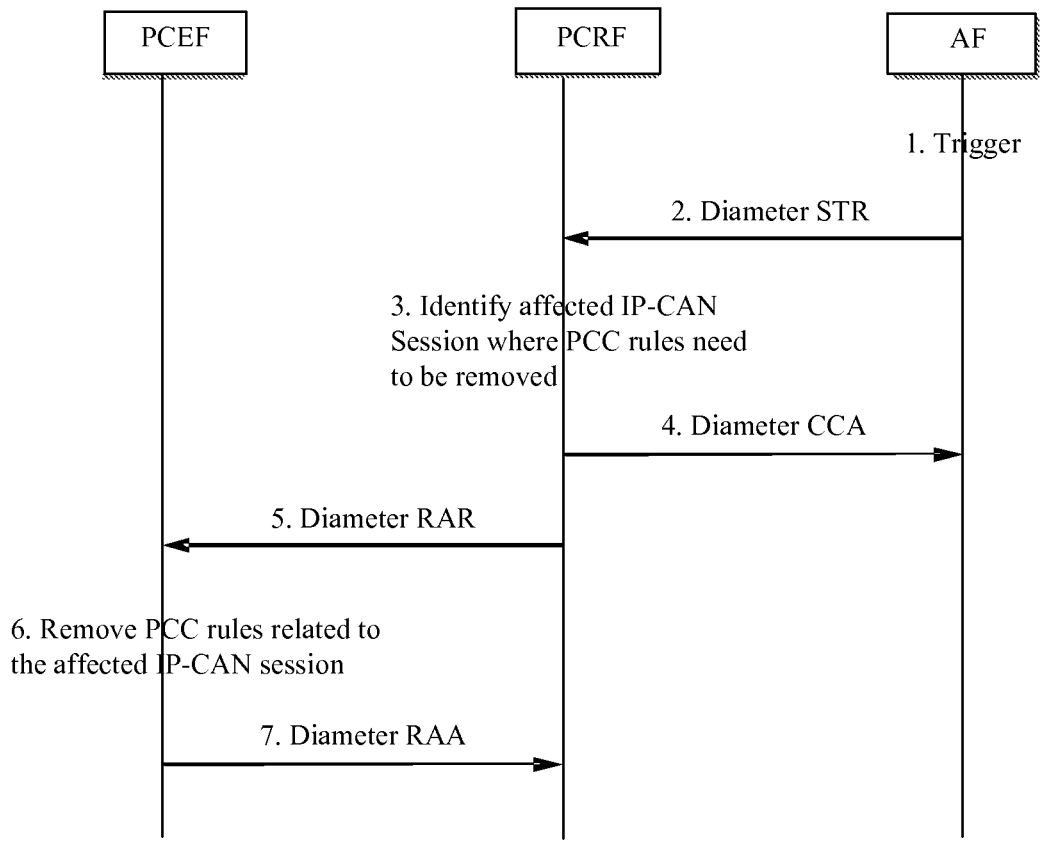
FIG. 2 shows a flow chart of releasing an IP-CAN/bearer session initiated by an AF device in the prior art.

FIG. 2 shows a flow chart of releasing an IP-CAN/bearer session initiated by an AF device in the prior art, wherein an AF session is released when there is no active service, and the IP-CAN/bearer session have to be released.

As shown in FIG. 2, when an AF device detects a predetermined triggering condition is satisfied, for example, if there is no active service, the AF device sends a Diameter STR (session termination request) regarding an AF session to a PCRF device; then, the PCRF device identifies affected IP-CAN session where charging rules need to be removed, and sends a Diameter STA (session termination answer) to the AF device; the PCRF device sends a Diameter RAR (re-authentication request) for the identified IP-CAN session to a PCEF device; the PCEF device removes the charging rules related to the above mentioned IP-CAN session and returns a Diameter RAA (re-authentication answer) to the PCRF device.

Figure 3A:
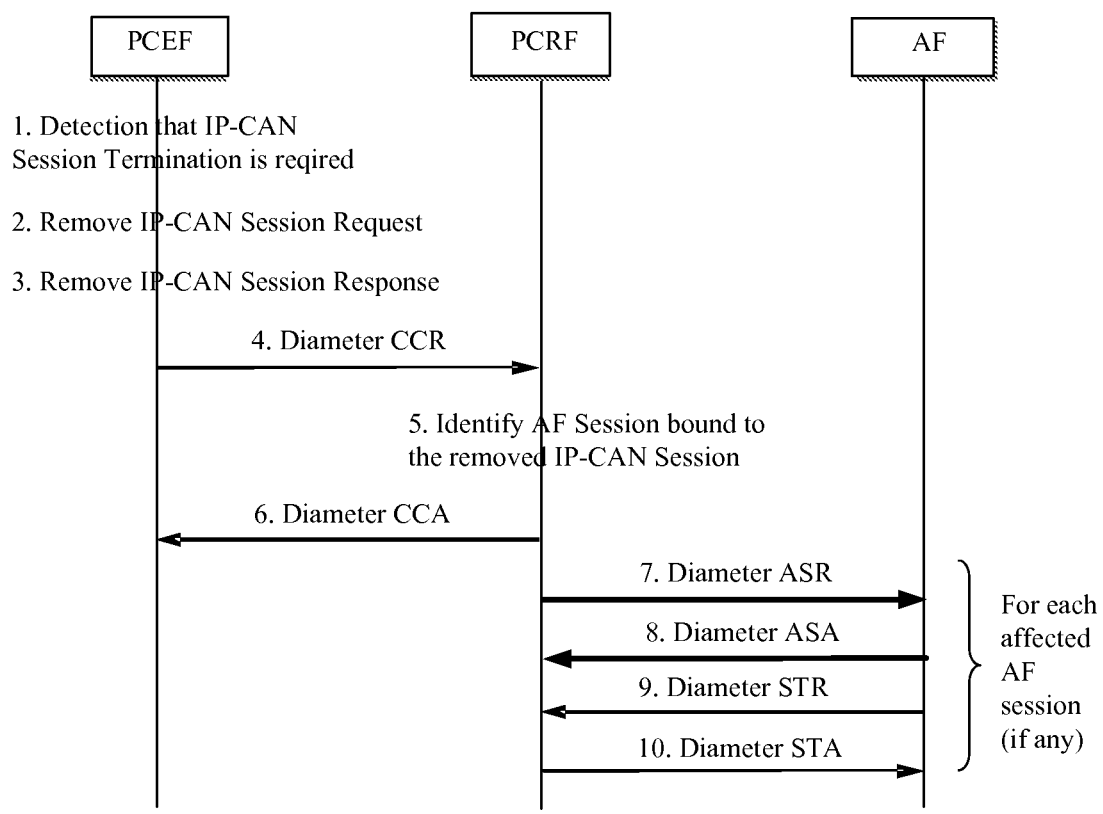
FIG. 3a shows a flow chart of a method of releasing an AF session initiated by a PCEF device in the prior art.

FIG. 3a shows a flow chart of a method of releasing an AF session initiated by a PCEF device in the prior art.

As shown in FIG. 3a, when the PCEF device detects that a predetermined triggering condition is satisfied, for example, IP-CAN session termination is required, the PCEF device removes the IP-CAN session request and its response; next, the PCEF device sends a Gx CCR (credit control request) to the PCRF device; the PCRF device identifies AF session bound to the removed IP-CAN session and sends a Gx CCA (credit control answer) to the PCEF device; for each affected AF session, the PCRF device sends an ASR (abort session request) to the AF device; and the AF device returns an AAA (abort session answer) to the PCRF device; then, the AF device sends a STR to the PCRF device, and the PCRF device returns a STA to the AF device.

Figure 3B:
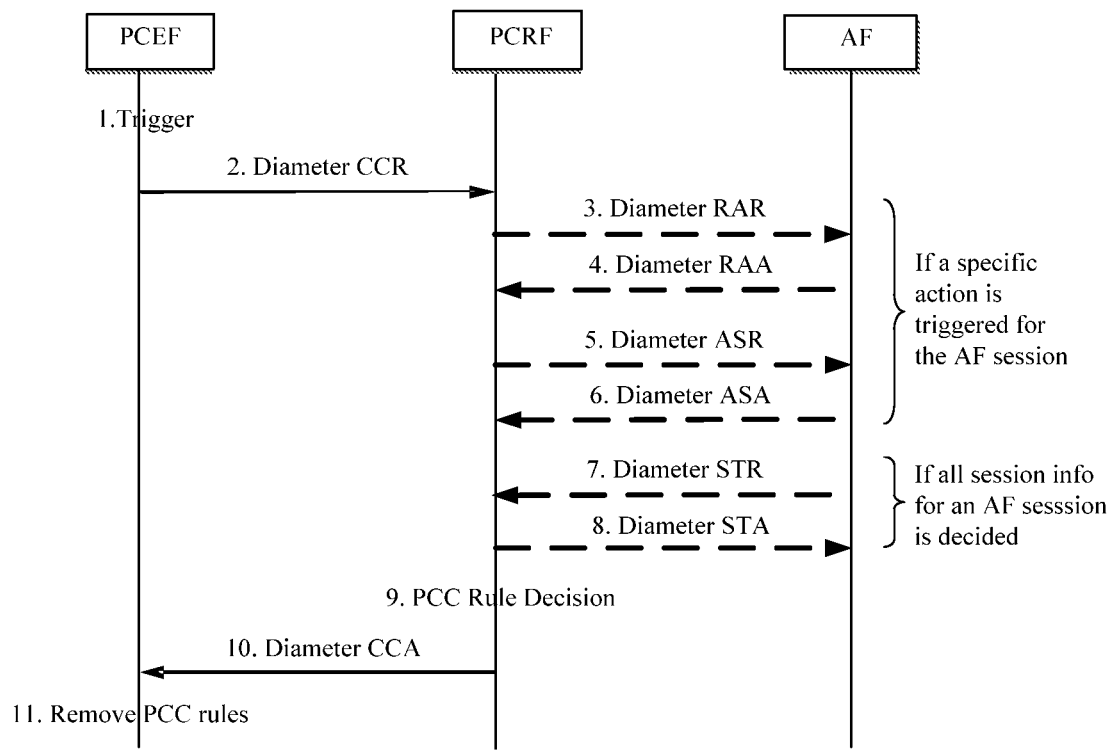
FIG. 3b shows a flow chart of another method of releasing an AF session initiated by a PCEF device in the prior art.

FIG. 3b shows a flow chart of another method of releasing an AF session initiated by a PCEF device in the prior art.

As shown in FIG. 3b, when the PCEF device detects that a predetermined triggering condition is satisfied, for example, receiving a request for IP-CAN session modification, the PCEF device sends a CCR (credit control request) to the PCRF device; if all session information for an AF session is decided, the PCRF device sends a STR to the AF device; correspondingly, the AF device returns a STA to the PCRF device; if a specific action is triggered for the AF session, the PCRF device sends a RAR to the AF device; correspondingly, the AF device returns a RAA to the PCRF device; in some possible scenarios, the PCRF device will further send an ASR (abort session request) to the AF device thereafter; correspondingly, the AF device returns an AAA (abort session answer) to the PCRF device; the PCRF makes a PCC rule decision based on the answer information returned by the AF device and sends a CCA (credit control answer) to the PCEF device; the PCEF device removes the corresponding PCC rules.

The prior art exists such a scenario: when a user equipment is in a long duration session state, i.e., the always on IP connectivity session, and no service is used for a while, however, the PCEF device still has to request the OCS to allocate corresponding credit quota for the user equipment during this period; and when the allocated timer expires, the PCEF device has to further request the OCS to allocate the user equipment credit quote. In other words, even if no usage of the network services occurs to the user, the PCEF device and the OCS still have to constantly perform charging processing for the user equipment, thereby causing great waste in the resources of the PCEF device and the OCS and occupying resources potentially provided to other users, and further placing too much burden on the PCEF device and the OCS and affecting user experience.

The present invention can solve the above problem and describe the scenarios of charging termination processing initiated by the AF device and the PCEF device, respectively. The preferred embodiments will be further illustrated hereinafter.

Figure 4:
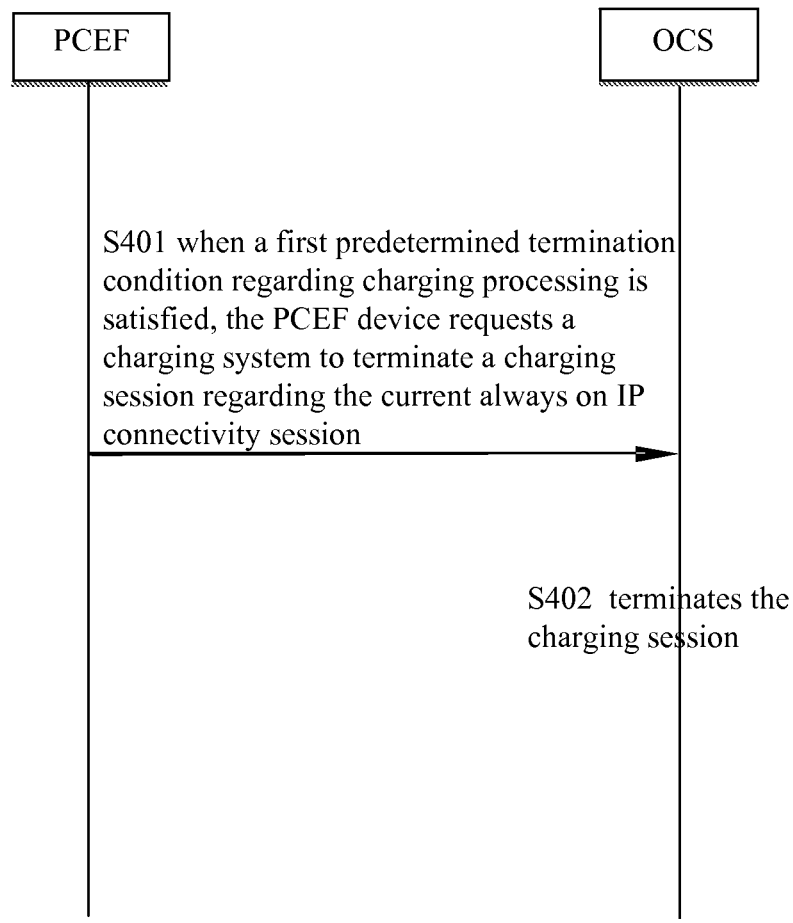
FIG. 4 shows a flow chart of a method of determining to terminate a charging session according to one embodiment of the present invention.

FIG. 4 shows a method flow chart according to one embodiment of the present invention, which shows a process of directly requesting a charging system to terminate a charging session by a first charging session termination request device.

Here, a PCEF device is taken as an example for the first charging session termination request device. However, those skilled in the art should understand that the PCEF device here is merely an example and only for illustrating the present invention, which should not be regarded as any restriction to the present invention, and other existing devices or other devices possibly evolved in the future, if they can likewise implement the solution as sought for protection in the present invention, should be included within the protection scope of the present invention.

Besides, for the convenience of depiction, the present invention illustrates a charging session with a Gy/Ro session in most cases, and the two are used equivalently hereby. However, those skilled in the art should understand that the Gy/Ro session is merely an example and only for illustrating the present invention, which should not be regarded as any restraint to the present invention; other existing charging sessions or other charging sessions possibly evolved in the future, for example, a Gz session, if they can likewise implement the solution as sought for protection in the present invention, should be included within the protection scope of the present invention.

As illustrated in FIG. 4, in the step S401, when a first predetermined termination condition regarding charging processing is satisfied, the PCEF device requests a charging system to terminate a charging session regarding the current always on IP connectivity session.

Here, the first predetermined termination condition regarding the charging processing, includes but not limited to at least one of the following conditions:

1) a termination condition determined from the perspective of IP-CAN connection of a single user/device, which may specifically comprise:

a) no service or traffic within a given time, wherein the "no service" may further comprise a scenario in which an active service is identified as a free service;

b) credit quota for data category/data flows allocated by the OCS is run out.

2) a termination condition determined from the perspective of all resources provided by the PCEF device, which may specifically comprise:

a) no active service or no traffic at all within a given time for all monitored data flows by the OCS, wherein the "no active service" may further comprise a scenario in which an active service is identified as free service;

b) traffic congestion is occurred between the OCS and the PCEF device.

When it is detected that one of the above first termination conditions, the PCEF device directly sends a CCA to the OCS via Gy interface, to request for terminating the charging session regarding the current always on IP connectivity session, for example, a Gy/Ro session.

Next, in the step S402, the charging system terminates the charging session between itself and the PCEF device based on this request.

When the charging system comprises the OCS, online charging control information is transmitted between the PCEF device and the OCS via Gy interface.

When the charging system comprises the OFCS, offline charging-based data flow is transmitted between the PCEF device and the OFCS via Gz interface.

Further, the PCEF device may pre-define termination rule for charging session, such that the PCEF device can request the OCS to terminate the charging session based on the pre-defined termination rule corresponding to the charging session, with detection that a first predetermined termination condition regarding charging processing is satisfied.

Here, the termination rule corresponding to the charging session includes but not limited to any one of the following items:

1) permanently terminating the charging session and the current always on IP connectivity session;

2) permanently terminating the charging session but keeping the current always on IP connectivity session;

3) terminating the charging session, and re-opening the charging session when a predetermined re-open condition is satisfied; wherein the PCEF device will detect whether a predetermined re-open condition regarding re-opening a new charging session is satisfied after the current charging session is terminated, the re-open condition at least may include expiration of a global timer or detection of a new service data flow; when it is detected that the re-open condition is satisfied, the PCEF device will re-open a charging session between itself and the OCS.

In 3GPP, there is a quota hold timer (QHT) defined by the OCS and sent to the PCEF device; if the QHT expires, the corresponding data flow will be terminated. However, the QHT is at MSCC (multiple service credit control) level. The existing Gy/Ro mechanism allows termination of a MSCC session for a given credit control. However, termination of a MSCC session cannot indicate a termination of Gy/Ro session.

Thus, the present invention defines a global timer in Gy/Ro interface command level besides MSCC level; if the command level timer expires, if there is no packet detected from the network for all monitored data flows, the PCEF device can send a CCR to the OCS to terminate the charging session, but still keep the current always on IP connectivity session active.

Figure 5:
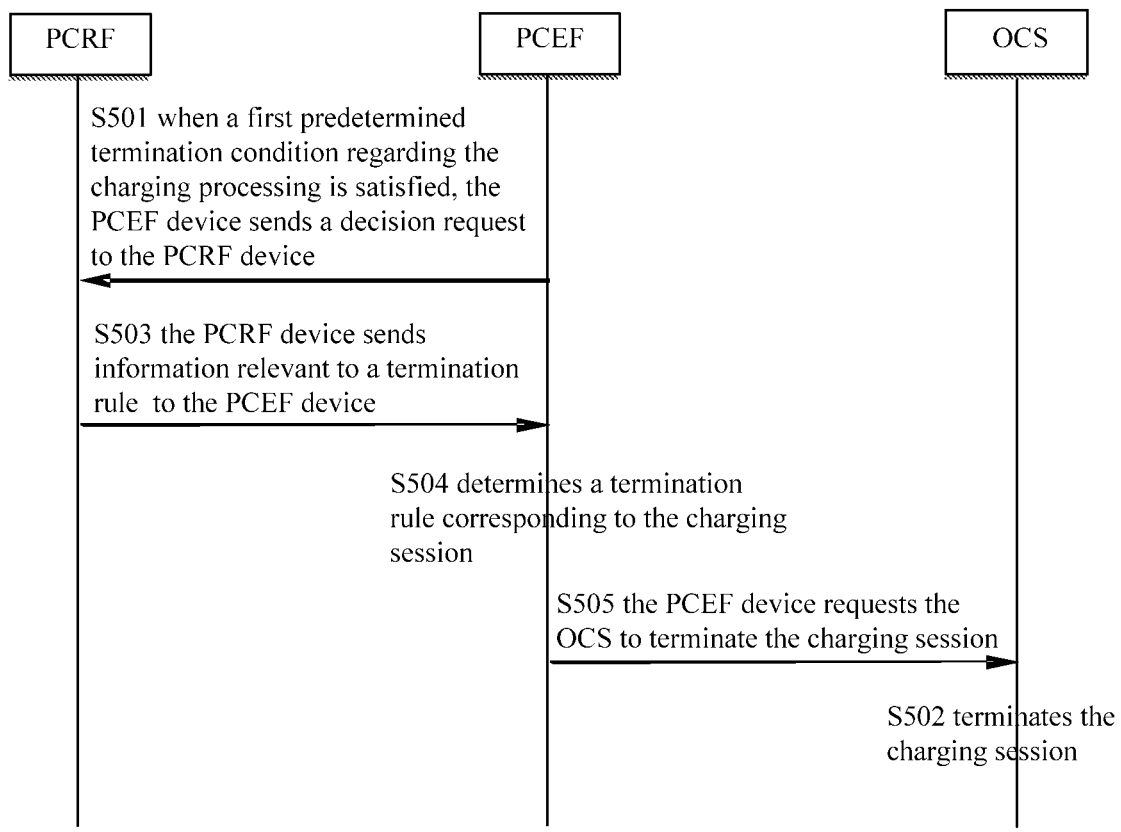
FIG. 5 shows a flow chart of a method of determining to terminate a charging session according to another embodiment of the present invention.

FIG. 5 shows a method flow chart according to another embodiment of the present invention, which shows a process of terminating a charging session initiated by a first charging session termination request device. As shown in FIG. 5, the process is implemented by cooperation between the first charging session termination request device and a charging session termination decision device.

For the convenience of depiction, here, a PCEF device and a PCRF device are taken as examples for the first charging session termination request device and the charging session termination decision device, respectively. However, those skilled in the art should understand that the PCEF device and the PCRF device here are merely examples and only for illustrating the present invention, which should not be regarded as any restriction to the present invention, and other existing devices or other devices possibly evolved in the future, if they can likewise implement the solution as sought for protection in the present invention, should be included within the protection scope of the present invention.

Moreover, since the charging session is a Gy reference point-based session between the PCEF device and the OCS, the initiating device for the charging session is the PCEF device.

As shown in FIG. 5, in the step S501, when it is detected that a first predetermined termination condition regarding the charging processing is satisfied, the PCEF device sends a decision request for terminating the charging processing of the current always on IP connectivity session to the PCRF device; correspondingly, the PCRF device receives the decision request from the PCEF device; in the step S503, the PCRF device sends information relevant to a termination rule corresponding to the charging session of the current always on IP connectivity session to the PCEF device, in response to the decision request; correspondingly, the PCEF device receives the information relevant to the termination rule corresponding to the charging session; in the step S504, the PCEF device determines a termination rule corresponding to the charging session based on the received information relevant to the termination rule, in the step S505, the PCEF device requests the OCS to terminate the charging session based on the determined termination rule. Next, in the step S502, the OCS terminates the charging session between itself and the PCEF device based on this request.

Here, the first termination condition regarding the charging processing, for the PCEF device of FIG. 5 to perform detection, may be identical to the first termination condition as illustrated in FIG. 4.

When the PCEF device detects that the first predetermined termination condition regarding the charging processing is satisfied, for example, if there is no service or traffic within a given time, it sends a CCR with additional new AVPs (attribute-value pair) to the PCRF device via Gx interface and requests an update of charging policy; the PCRF device responds with a Gx CCA to allow termination of the charging session.

Further, when the PCRF device receives the above decision request, it can determine a termination rule corresponding to the corresponding charging session, and send the information relevant to the termination rule to the PCEF device. Here, the termination rule can be defined by the PCRF device or the PCEF device:

1) when the termination rule is pre-defined by the PCEF device, the PCRF device can send a trigger instruction corresponding to the termination rule to the PCEF device, for example, sending a Gx RAR or CCA to the PCEF device to activate a corresponding termination rule;

2) when the termination rule is defined by the PCRF device, the defined termination rule can be either unconditional or conditional.

If the termination rule pre-defined by the PCRF device is unconditional, as long as the PCRF device receives the decision request, it will send the termination rule for the charging session to the PCEF device. The termination rule will terminate the charging session but keep the existing charging rule alive for a new charging session when any new service or traffic occurs during the current IP-CAN session which has not been terminated.

If the termination rule defined by the PCRF device is conditional, as long as the PCRF device receives the decision request, it will send the termination rule to the PCEF device. The termination rule will provide additional rules and parameters, and all parameters meet at the traffic plane; the PCEF device terminates the charging session thereby. Likewise, the PCEF device keeps the existing charging rule alive for a new charging session when any new service or traffic occurs during the current IP-CAN session which has not been terminated.

Here, the termination rules for the charging session defined by the PCRF device may be identical to the termination rules for the charging session pre-defined by the PCEF device in FIG. 4. Therefore, the re-open condition for the abovementioned new charging session, for example, a timer, may be defined by the PCRF device.

Figure 6:
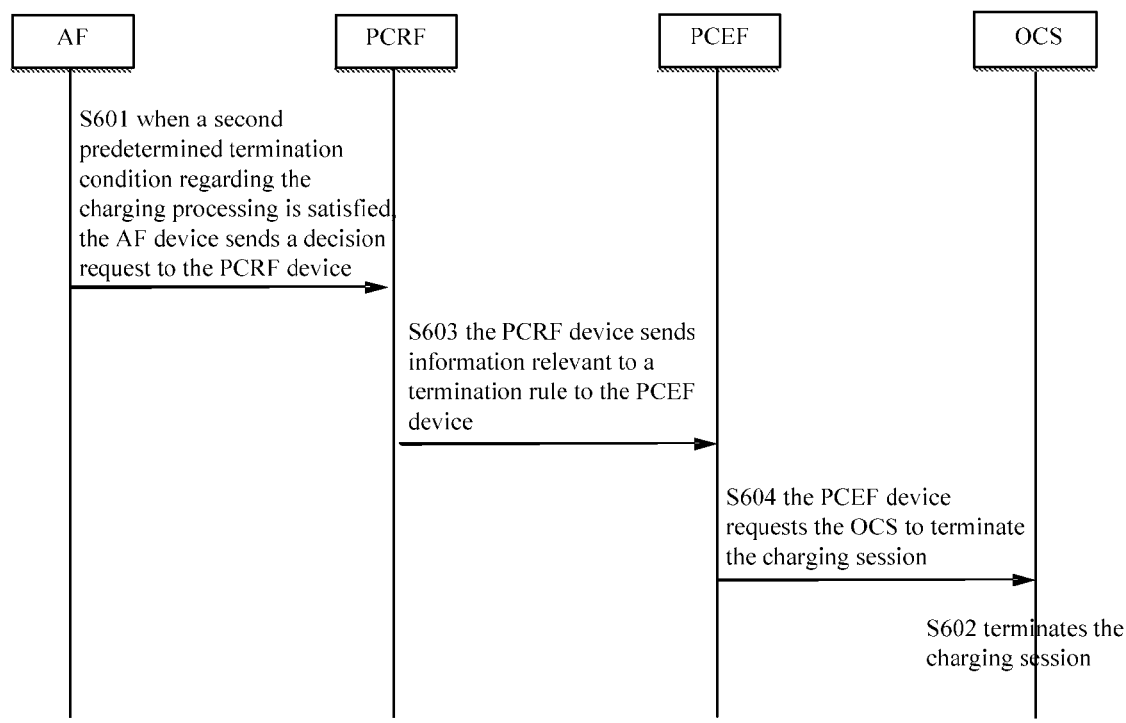
FIG. 6 shows a flow chart of a method of determining to terminate a charging session according to a further embodiment of the present invention.

FIG. 6 shows a method flow chart according to a further embodiment of the present invention, which shows a process of terminating a charging session initiated by a second charging session termination request device. As shown in FIG. 6, the process is collaboratively implemented by the second charging session termination request device, a third charging session termination request device, and a charging session termination decision device.

For the convenience of depiction, here, an AF device, a PCEF device and a PCRF device are taken as examples for the second charging session termination request device, the third charging session termination request device, and the charging session termination decision device, respectively. However, those skilled in the art should understand that the AF device, the PCEF device and the PCRF device here are merely examples and only for illustrating the present invention, which should not be regarded as any restriction to the present invention, and other existing devices or other devices possibly evolved in the future, if they can likewise implement the solution as sought for protection in the present invention, should be included within the protection scope of the present invention.

Moreover, since the charging session is a Gy reference point-based session between the PCEF device and the OCS, the initiating device for the charging session is the PCEF device.

As illustrated in FIG. 6, in the step S601, when it is detected that a second predetermined termination condition regarding the charging processing is satisfied, the AF device sends a decision request for terminating the charging processing of the current always on IP connectivity session to the PCRF device; correspondingly, the PCRF device receives the decision request from the AF device; in the step S603, the PCRF device sends information relevant to a termination rule corresponding to the charging session of the current always on IP connectivity session to the PCEF device, in response to the decision request; correspondingly, the PCEF device receives the information relevant to the termination rule corresponding to the charging session; in the step S604, the PCEF device requests the OCS to terminate the charging session based on the received information relevant to the termination rule. Next, in the step S602, the OCS terminates the charging session between itself and the PCEF device based on this request.

Here, the second termination condition regarding the charging processing, for the AF device of FIG. 6 to perform detection may be identical or partially identical to the first termination condition regarding the charging processing for the PCEF device to perform detection as illustrated in FIG. 4 or FIG. 5.

When it is detected that the second predetermined termination condition regarding the charging processing is satisfied, for example, if there is no service within a given time in application plane, the AF device sends a STR with additional new AVPs to the PCRF device so as to request for termination of the charging session. An alternative implementation is that the AF device sends an AAR with specific AVPs to the PCRF device so as to request for termination of the charging session.

Similar to FIG. 5, when the PCRF device receives the above decision request, it can determine a termination rule corresponding to the corresponding charging session, and send the information relevant to the termination rule to the PCEF device. At this point, the termination rule can be defined by the PCRF device or the PCEF device:
1) when the termination rule is pre-defined by the PCEF device, the PCRF can send a trigger instruction corresponding to the termination rule to the PCEF device, for example, sending a Gx RAR or CCA to the PCEF device to activate a corresponding termination rule;
2) when the termination rule is defined by the PCRF, the defined termination rule can be either unconditional or conditional.

If the termination rule pre-defined by the PCRF device is unconditional, as long as the PCRF device receives the decision request, it will send the termination rule of the charging session to the PCEF device. The termination rule will terminate the charging session but keep the existing charging rule alive for a new charging session when any new service or traffic occurs during the current IP-CAN session which has not been terminated.

If the termination rule defined by the PCRF device is conditional, as long as the PCRF device receives the decision request, it will send the termination rule to the PCEF device. The termination rule will provide additional rules and parameters, and all parameters meet at the traffic plane; the PCEF device terminates the charging session thereby. Likewise, the PCEF device keeps the existing charging rule alive for a new charging session when any new service or traffic occurs during the current IP-CAN session which has not been terminated.

Here, the termination rules for the charging session defined by the PCRF device may be identical to the termination rules for the charging session defined by the PCEF device in FIG. 4 or FIG. 5. Therefore, the re-open condition for the abovementioned new charging session, for example, a timer, may be defined by the PCRF device.

Further, when the PCRF device receives the Rx STR or AAR from the AF device, the PCRF device can terminate the AF session, which does not affect the PCRF device decision in terminating the Gy/Ro session. If there are multiple AF sessions associated with the current IP-CAN, the PCRF device will terminate the AF sessions which has no active service. If there is at least one AF session active, the PCRF device will not terminate the Gy/Ro session. When the PCRF device terminates an AF session, it will correspondingly remove the PCC rules for such kind of AF session.

Terminating all related AF sessions, does not mean the PCRF device absolutely terminate the Gy/Ro session because there could be some services and data flows which do not involve in AF session. Therefore, the following exceptions exist:
1) if the AF device initiates termination of the charging session, but the termination conditions are not clearly defined at the PCEF device, the PCEF device will send a Gx CCR to the PCRF device to counteroffer the termination rule. It is applicable to the scenario in which there is no active AF session, but active bearer. The PCRF device will coordinate the termination rule.
2) When the PCRF device receives the Rx STR or AAR from the AF device triggering the termination of the charging session, the PCRF device will send a RAR to the PCEF device to inform it, and the PCEF device responds with a RAA. Next, the PCRF device re-sends a RAR with final coordinated rules to the PCEF device, and new AVP should be added to distinct the two RARs and their functionalities.

Figure 7:
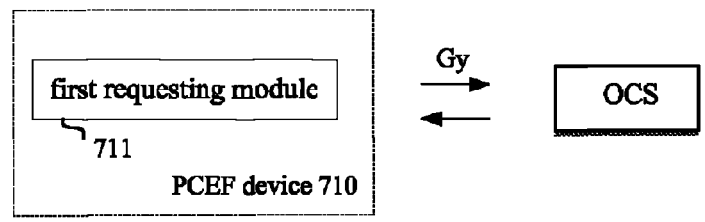
FIG. 7 shows a schematic diagram of a first charging session termination request device (PCEF device) for determining to terminate a charging session according to one embodiment of the present invention.

FIG. 7 shows an apparatus diagram according to one embodiment of the present invention, which shows a first charging session termination request device directly requesting a charging system to terminate a charging session.

Here, a PCEF device 710 is taken as an example for the first charging session termination request device. However, those skilled in the art should understand that the PCEF device 710 here is merely an example and only for illustrating the present invention, which should not be regarded as any restriction to the present invention, and other existing devices or other devices possibly evolved in the future, if they can likewise implement the solution as sought for protection in the present invention, should be included within the protection scope of the present invention.

Besides, for the convenience of depiction, the present invention illustrates a charging session with a Gy/Ro session in most cases, and the two are used equivalently hereby. However, those skilled in the art should understand that the Gy/Ro session is merely an example and only for illustrating the present invention, which should not be regarded as any restraint to the present invention; other existing charging sessions or other charging sessions possibly evolved in the future, for example, a Gz session, if they can likewise implement the solution as sought for protection in the present invention, should be included within the protection scope of the present invention.

As illustrated in FIG. 7, the PCEF device 710 comprises a first requesting module 711.

When a first predetermined termination condition regarding charging processing is satisfied, the first request module 711 requests a charging system to terminate a charging session regarding the current always on IP connectivity session.

Here, the first predetermined termination condition regarding the charging processing, includes but not limited to at least one of the following conditions:
1) a termination condition determined from the perspective of IP-CAN connection of a single user/device, which may specifically comprise:
a) no service or traffic within a given time, wherein the "no service" may further comprise a scenario in which an active service is identified as a free service;
b) credit quota for data category/data flows allocated by the OCS is run out.
2) a termination condition determined from the perspective of all resources provided by the PCEF device 710, which may specifically comprise:
a) no active service or no traffic at all within a given time for all monitored data flows by the OCS, wherein the "no active service" may further comprise a scenario in which an active service is identified as free service;
b) traffic congestion is occurred between the OCS and the PCEF device 710.

When it is detected that one of the above first termination conditions, the first requesting module 711 directly sends a CCA to the OCS via Gy interface, to request for terminating the charging session regarding the current always on IP connectivity session, for example, a Gy/Ro session.

Next, the charging system terminates the charging session between itself and the PCEF device 710 based on this request.

When the charging system comprises the OCS, online charging control information is transmitted between the PCEF device 710 and the OCS via Gy interface.

When the charging system comprises the OFCS, offline charging-based data flow is transmitted between the PCEF device 710 and the OFCS via Gz interface.

Further, the first requesting module 711 or other modules in the PCEF device 710 may further pre-define termination rule for charging session, such that the first requesting module 711 can request the OCS to terminate the charging session based on the pre-defined termination rule corresponding to the charging session, with detection that a first predetermined termination condition regarding charging processing is satisfied.

Here, the termination rule corresponding to the charging session includes but not limited to any one of the following items:
1) permanently terminating the charging session and the current always on IP connectivity session;
2) permanently terminating the charging session but keeping the current always on IP connectivity session;
3) terminating the charging session, and re-opening the charging session when a predetermined re-open condition is satisfied; wherein the PCEF device will detect whether a predetermined re-open condition regarding re-opening a new charging session is satisfied after the current charging session is terminated, the re-open condition at least may include expiration of a global timer or detection of a new service data flow; when it is detected that the re-open condition is satisfied, the PCEF device will re-open a charging session between itself and the OCS.

In 3GPP, there is a quota hold timer (QHT) defined by the OCS and sent to the PCEF device; if the QHT expires, the corresponding data flow will be terminated. However, the QHT is at MSCC (multiple service credit control) level. The existing Gy/Ro mechanism allows termination of a MSCC session for a given credit control. However, termination of a MSCC session cannot indicate a termination of Gy/Ro session.

Thus, the present invention defines a global timer in Gy/Ro interface command level besides MSCC level; if the command level timer expires, if there is no packet detected from the network for all monitored data flows, the PCEF device can send a CCR to the OCS to terminate the charging session, but still keep the current always on IP connectivity session active.

Figure 8:
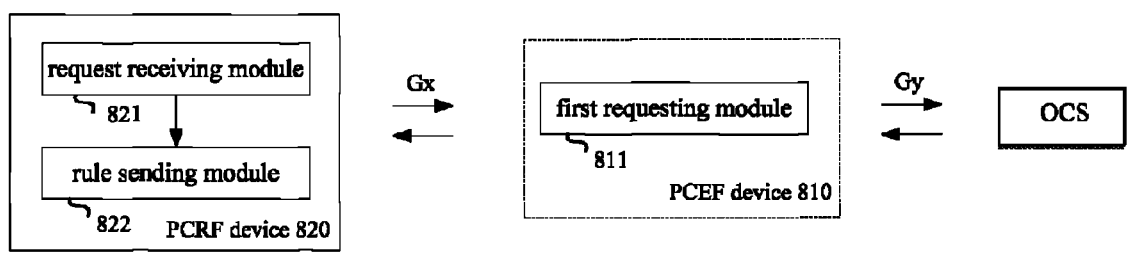
FIG. 8 shows a schematic diagram of a first charging session termination request device (PCEF device) and a charging session termination decision device (PCRF device) for determining to terminate a charging session according to another embodiment of the present invention.

FIG. 8 illustrates an apparatus diagram according to another embodiment of the present invention, which shows a first charging session termination request device and a charging session termination decision device which cooperate to implement termination of a charging session.

For the convenience of depiction, here, a PCEF device 810 and a PCRF device 820 are taken as examples for the first charging session termination request device and the charging session termination decision device, respectively. However, those skilled in the art should understand that the PCEF device 810 and the PCRF device 820 here are merely examples and only for illustrating the present invention, which should not be regarded as any restriction to the present invention, and other existing devices or other devices possibly evolved in the future, if they can likewise implement the solution as sought for protection in the present invention, should be included within the protection scope of the present invention.

Moreover, since the charging session is a Gy reference point-based session between the PCEF device and the OCS, the initiating device for the charging session is the PCEF device 810.

As shown in FIG. 8, the PCEF device 810 comprises a first requesting module 811; the PCRF device 820 comprises a request receiving module 821 and a rule sending module 822, wherein the first requesting module 811 may further comprise a decision request unit (not shown), a rule receiving unit (not shown), and a termination request unit (not shown) to perform respective specific operations.

When it is detected that a first predetermined termination condition regarding the charging processing is satisfied, the decision requesting unit of the first requesting module 811 sends a decision request for terminating the charging processing of the current always on IP connectivity session to the PCRF device 820; correspondingly, the request receiving module 821 of the PCRF device 820 receives the decision request from the PCEF device 810; the rule sending module 822 sends information relevant to a termination rule corresponding to the charging session of the current always on IP connectivity session to the PCEF device 810, in response to the decision request; correspondingly, the rule receiving unit of the first requesting module 811 receives the information relevant to the termination rule corresponding to the charging session; the termination request unit of the first requesting module 811 determines a termination rule corresponding to the charging session based on the received information relevant to the termination rule, so as to request the OCS to terminate the charging session. Next, the OCS terminates the charging session between itself and the PCEF device 810 based on this request.

Here, the first termination condition regarding the charging processing, for the PCEF device 810 of FIG. 8 to perform detection, may be identical to the first termination condition as illustrated in FIG. 7.

When the decision requesting unit of the first requesting module 811 detects that the first predetermined termination condition regarding the charging processing is satisfied, for example, if there is no service or traffic within a given time, it sends a CCR with additional new AVPs (attribute-value pair) to the PCRF device 820 via Gx interface and requests an update of charging policy; the PCRF device 820 responds with a Gx CCA to allow termination of the charging session.

Further, when the request receiving module 821 of the PCRF device 820 receives the above decision request, the rule sending module 822 can determine a termination rule corresponding to the corresponding charging session, and sends the information relevant to the termination rule to the PCEF device 810. Here, the termination rule can be defined by the PCRF device 820 or the PCEF device 810:

1) when the termination rule is pre-defined by the PCEF device 810, the rule sending module 822 can send a trigger instruction corresponding to the termination rule to the PCEF device 810, for example, sending a Gx RAR or CCA to the PCEF device 810 to activate a corresponding termination rule;

2) when the termination rule is defined by the PCRF device 820, specifically defined by the rule sending module 822 or other modules in the PCRF device 820, the defined termination rule can be either unconditional or conditional.

If the termination rule pre-defined by the PCRF device 820 is unconditional, as long as the PCRF device 820 receives the decision request, it will send the termination rule for the charging session to the PCEF device 810. The termination rule will terminate the charging session but keep the existing charging rule alive for a new charging session when any new service or traffic occurs during the current IP-CAN session which has not been terminated.

If the termination rule defined by the PCRF device 820 is conditional, as long as the PCRF device 820 receives the decision request, it will send the termination rule to the PCEF device 810. The termination rule will provide additional rules and parameters, and all parameters meet at the traffic plane; the PCEF device 810 terminates the charging session thereby. Likewise, the PCEF device 810 keeps the existing charging rule alive for a new charging session when any new service or traffic occurs during the current IP-CAN session which has not been terminated.

Here, the termination rules for the charging session defined by the PCRF device 820 may be identical to the termination rules for the charging session pre-defined by the PCEF device 810 in FIG. 7. Therefore, the re-open condition for the abovementioned new charging session, for example, a timer, may be defined by the PCRF device 820.

Figure 9:
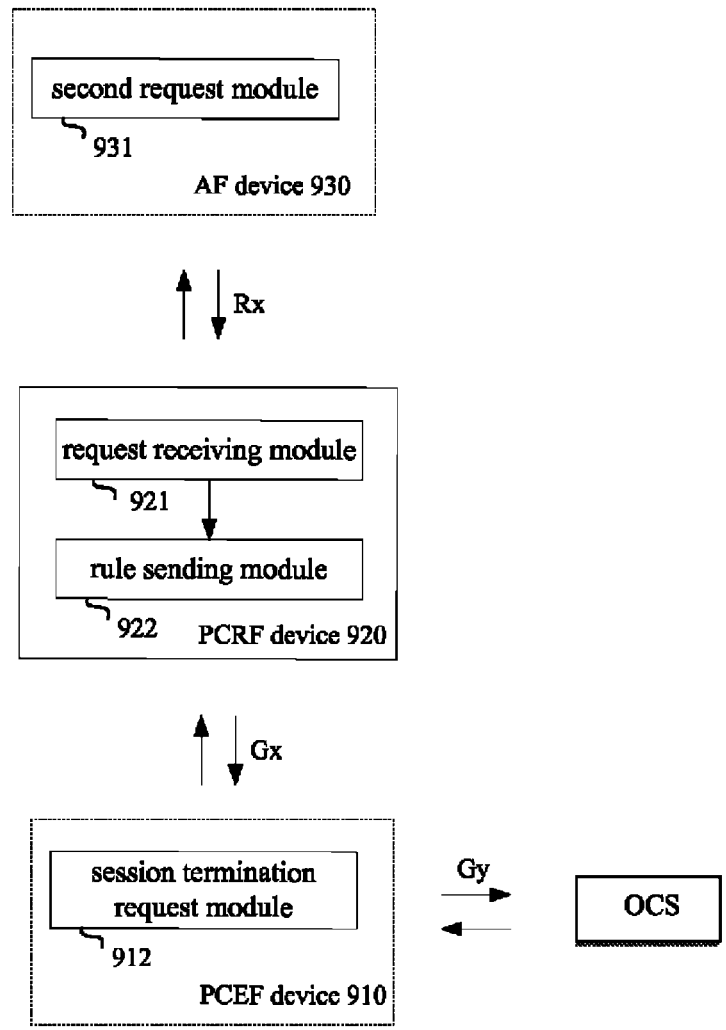
FIG. 9 shows a schematic diagram of a second charging session termination request device (AF device), a third charging session termination request device (PCEF device), and a charging session termination decision device (PCRF device) for determining to terminate a charging session according to a further embodiment of the present invention.

FIG. 9 illustrates an apparatus diagram according to a further embodiment of the present invention, which shows a second charging session termination request device, a third charging session termination request device, and a charging session termination decision device which cooperate to implement termination of a charging session.

For the convenience of depiction, here, an AF device 930, a PCEF device 910 and a PCRF device 920 are taken as examples for the second charging session termination request device, the third charging session termination request device, and the charging session termination decision device, respectively. However, those skilled in the art should understand that the AF device 930, the PCEF device 910 and the PCRF device 920 here are merely examples and only for illustrating the present invention, which should not be regarded as any restriction to the present invention, and other existing devices or other devices possibly evolved in the future, if they can likewise implement the solution as sought for protection in the present invention, should be included within the protection scope of the present invention.

Moreover, since the charging session is a Gy reference point-based session between the PCEF device and the OCS, the initiating device for the charging session is the PCEF device 910.

As illustrated in FIG. 9, the AF device 930 comprises a second requesting module 931; the PCRF device 920 comprises a request receiving module 921 and a rule sending module 922; and the PCEF device 910 comprises a session termination request module 912.

When it is detected that a second predetermined termination condition regarding the charging processing is satisfied, the second requesting module 931 of the AF device 930 sends a decision request for terminating the charging processing of the current always on IP connectivity session to the PCRF device 920; correspondingly, the request receiving module 921 of the PCRF device 920 receives the decision request from the AF device 930; the rule sending module 922 sends information relevant to a termination rule corresponding to the charging session of the current always on IP connectivity session to the PCEF device 910, in response to the decision request; correspondingly, the session termination request module 912 of the PCEF device 910 receives the information relevant to the termination rule corresponding to the charging session and requests the OCS to terminate the charging session based on the received information relevant to the termination rule. Next, the OCS terminates the charging session between itself and the PCEF device 910 based on this request.

Here, the second termination condition regarding the charging processing, for the AF device 930 of FIG. 9 to perform detection may be identical or partially identical to the first termination condition regarding the charging processing for the PCEF device 910 to perform detection as illustrated in FIG. 7 or FIG. 8.

When it is detected that the second predetermined termination condition regarding the charging processing is satisfied, for example, if there is no service within a given time in application plane, the second requesting module 931 of the AF device 930 sends a STR with additional new AVPs to the PCRF device 920 so as to request for termination of the charging session. An alternative implementation is that the second requesting module 931 sends an AAR with specific AVPs to the PCRF device 920 so as to request for termination of the charging session.

Similar to FIG. 8, when the request receiving module 921 of the PCRF device 920 receives the above decision request, the rule sending module 922 can determine a termination rule corresponding to the corresponding charging session, and sends the information relevant to the termination rule to the PCEF device 910. At this point, the termination rule can be defined by the PCRF device 920 or the PCEF device 910:

1) when the termination rule is pre-defined by the PCEF device 910, the PCRF 920 can send a trigger instruction corresponding to the termination rule to the PCEF device 910, for example, sending a Gx RAR or CCA to the PCEF device 910 to activate a corresponding termination rule;

2) when the termination rule is defined by the PCRF 920, the defined termination rule can be either unconditional or conditional.

If the termination rule pre-defined by the PCRF device 920 is unconditional, as long as the PCRF device 920 receives the decision request, it will send the termination rule of the charging session to the PCEF device 910. The termination rule will terminate the charging session but keep the existing charging rule alive for a new charging session when any new service or traffic occurs during the current IP-CAN session which has not been terminated.

If the termination rule defined by the PCRF device 920 is conditional, as long as the PCRF device 920 receives the decision request, it will send the termination rule to the PCEF device 910. The termination rule will provide additional rules and parameters, and all parameters meet at the traffic plane; the PCEF device 910 terminates the charging session thereby. Likewise, the PCEF device 910 keeps the existing charging rule alive for a new charging session when any new service or traffic occurs during the current IP-CAN session which has not been terminated.

Here, the termination rules for the charging session defined by the PCRF device 920 may be identical to the termination rules for the charging session defined by the PCEF device 910 in FIG. 7 or FIG. 8. Therefore, the re-open condition for the abovementioned new charging session, for example, a timer, may be defined by the PCRF device 920.

Further, when the PCRF device 920 receives the Rx STR or AAR from the AF device 930, the PCRF device 920 can terminate the AF session, which does not affect the PCRF device 920 decision in terminating the Gy/Ro session. If there are multiple AF sessions associated with the current IP-CAN, the PCRF device 920 will terminate the AF sessions which has no active service. If there is at least one AF session active, the PCRF device 920 will not terminate the Gy/Ro session. When the PCRF device 920 terminates an AF session, it will correspondingly remove the PCC rules for such kind of AF session.

Terminating all related AF sessions, does not mean the PCRF device 920 absolutely terminate the Gy/Ro session because there could be some services and data flows which do not involve in AF session. Therefore, the following exceptions are defined:

1) if the AF device 930 initiates termination of the charging session, but the termination conditions are not clearly defined at the PCEF device 910, the PCEF device 910 will send a Gx CCR to the PCRF device 920 to counteroffer the termination rule. It is applicable to the scenario in which there is no active AF session, but active bearer. The PCRF device 920 will coordinate the termination rule.

2) When the PCRF device 920 receives the Rx STR or AAR from the AF device 930 triggering the termination of the charging session, the PCRF device 920 will send a RAR to the PCEF device 910 to inform it, and the PCRF device 920 responds with a RAA. Next, the PCRF device 920 re-sends a RAR with final coordinated rules to the PCEF device 910, and new AVP should be added to distinct the two RARs and their functionalities.

In the present invention, the PCEF device executes the Gy/Ro sessions per the rule defined by the PCRF device and/or by itself, wherein in the scenario where the PCEF device defines it own rules for terminating a charging session, the PCEF device will terminate the Gy/Ro session, but still keep the PDC connection, based on locally configured, eg. without the interference of the PCRF device.

1) If there is no active service or traffic within the IP-CAN session, the PCEF device will determine with the specified Gy/Ro session can be closed, but the IP-CAN be still opened or closed based on the rule.

2) If there are only some offline charging data flow or free charging data flow in the IP-CAN session, the Gy/Ro session can also be terminated.

Re-open Diameter Gy/Ro session with new rules defined after the Gy/Ro session was terminated previously by the policy. Re-open rules may include a timer driven by re-establish Diameter session when a timer expires, or the PCEF device/AF device encounters with a new prepaid service/data flow. Re-open rules can be pre-set at the PCEF device, or included in Gx from the PCRF device.

According to the present invention, the following network elements are enhanced:

1) An enhanced AF device can be further configured to:
a) detect no active services within a given time and report it to the PCRF device in a Rx STR/AAR with new AVP indication;
b) detect a newly active service and report it to the PCRF device in a Rx STR/AAR with new AVP indication.

2) An enhanced PCRF device can be further configured to:
a) receive from the AF device the Rx STR/AAR with new AVP indication for no active services, and determine whether to terminate the AF session;
b) determine whether there is no AF session remains for this IP-CAN;
c) receive from the PCEF device a Gx CCR with new AVP indication for no active services/data flow;
d) determine to terminate the charging session but keep the IP-CAN/bearer alive for long duration session;
e) send the termination rule for the charging session to the PCEF device;
f) determine whether the charging session is terminated unconditionally; if dependent on condition, send the condition criteria to the PCEF device;
g) receive from the PCEF device a counteroffer of termination of the charging session, and make updated policies and send them to the PCEF device;
h) determine a global timer for termination of the charging session and send it to the PCEF device;
i) determine a global Diameter Gy/Ro level timer for re-opened the charging session based on the previously terminated charging session, and send it to the PCEF device;
j) detect a newly active service that is triggered by the AF device or a PCEF device, and send new instruction to the PCEF device for re-opening a charging session;
k) when terminate or re-open the charging session, determine which existing policy and rule should be removed or stay but keep the IP-CAN/bearer alive.

3) An enhanced PCEF device can be further configured to:
①  in a PCEF device and PCRF device joint solution option, the PCEF device is further configured to:
a) detect no active services/data flow from the traffic plane within a given time, and report it to the PCRF device in a Gx CCR with new AVP indication;
b) detect network Diameter Gy/Ro traffic congestion, which requires terminate the charging session, and report it to the PCRF device in a Gx CCR with new AVP indication;
c) detect a newly active service/data flow, and report it to the PCRF device in a Gx CCR with new AVP indication;
d) pre-define PCEF level rules for termination of the charging session;
e) receive from the PCRF device a new policy on termination of the charging session;

f) receive from the PCRF device with conditions, and evaluate the condition, and determine whether to terminate the charging session and report it to the PCRF device;

g) pre-define a global timer, or receive the timer from either the PCRF device or the OCS, for termination of the charging session when no active service/data flow;

h) pre-define a global timer, or receive the timer from either the PCRF device or the OCS, for re-open a charging session since the termination of the charging session previously;

i) counteroffer with the PCRF device for termination of the charging session;

j) determine whether to keep the IP-CAN/bearer when terminating the charging session based on an offline charging or free charging service/data flow;

k) re-open the previously closed charging session based on i) a timer at the PCEF device, or ii) new instruction from the PCRF device, or iii) new service/data flow.

② in a PCEF device-only solution, the PCEF device can be further configured to:

a) optionally, the PCEF device can directly request the OCS to terminate the charging session based on the locally pre-configured rules when it is detected that one of the following conditions is satisfied:
- detect no active service/data flow from the traffic plane within a given time;
- detect network Diameter Gy/Ro traffic congestion, which requires terminate the charging session;
- the last data category is terminated;
- credit quota for data category/data flows allocated by the OCS is run out.

b) when a new service data flow occurs over PDN connection, the PCEF device can still perform corresponding operations based on the current PCC rules, without reporting to the PCRF device, and re-open the new charging session to the OCS.

4) An enhanced OCS can be further configured to:

a) support Diameter Gy/Ro level global timer in termination of the charging session;

b) evaluate a request from the PCEF device on termination of the charging session but keeping the IP-CAN/bearer alive, and determine whether allowing this type of termination based on the subscriber account information and the OCS rules; if not allowing, define a new result code and send it to the PCEF device;

c) when the last data category is terminated, or the OCS runs out of credit quota for data category/data flows, or the OCS is too busy, the OCS can initiate to terminate the charging session, but the PCEF device should still keep the PDN data connection.

5) the enhanced Diameter Interfaces, wherein:

① enhanced Rx interface, such that
The Rx STR and AAR operations are enhanced with a new AVP to indicate an ideal condition of online charging service.

② enhanced Gx interface, such that:

a) the Gx interface should allow reporting no active service/data flow with a new AVP;

b) the PCRF device can send a new policy rule for terminating the charging session to the PCEF device in a Rx RAR (push mode) or CCA (pull mode) with new AVPs;

c) the PCRF device should determine conditions/parameters in new AVPs for conditionally terminating the charging session;

d) the PCRF device should be able to determine and send a global timer (new AVP) to the PCEF device, for terminating the charging session e) when receiving a new AF active service, the PCRF device can re-open the charging session with new AVPs;

f) the PCEF device should be able to counteroffer the termination rule for the charging session in a RAR/RAA (allowing multiple RAR/RAA pair of operations;

③ enhanced Gy/Ro interface, such that:

a) a new global timer for Gy/Ro level, besides existing MSCC QHT, can be sent from either CCR (from the PCEF device to the OCS) or CCA (from the OCS to the PCEF device);

b) a new AVP to indicate the termination of the charging session but the IP-CAN still alive when the PCRF device sends a CCR. Therefore, the OCS can terminate the existing charging session, but aware of ongoing long duration session. If the subscriber account balance or the charging rule at the OCS does not allow this type of termination, the OCS will send a CCA with a new failure result code.

It should be noted that the present invention may be implemented in software or a combination of software and hardware; for example, it may be implemented by an ASIC (Application Specific Integrated Circuit), a general-purpose computer, or any other similar hardware devices.

The software program of the present invention may be executed by a processor to implement the above steps or functions. Likewise, the software program of the present invention (including relevant data structure) may be stored in a computer readable recording medium, for example, a RAM memory, a magnetic or optical driver, or a floppy disk, and other similar devices. Besides, some steps or functions of the present invention may be implemented by hardware, for example, a circuit cooperating with a processor to execute various functions or steps.

Additionally, a portion of the present invention may be applied as a computer program product, for example, a computer program instruction, which, may invoke or provide a method and/or technical solution according to the present invention through operations of the computer when executed by the computer. Further, the program instruction invoking the method of the present invention may be stored in a fixed or mobile recording medium, and/or transmitted through broadcast or data flow in other signal bearer media, and/or stored in a working memory of a computer device which operates based on the program instruction. Here, one embodiment according to the present invention comprises an apparatus comprising a memory for storing a computer program instruction and a processor for executing the program instruction, wherein when the computer program instruction is executed by the processor, the apparatus is triggered to run the methods and/or technical solutions according to a plurality of embodiments of the present invention.

To those skilled in the art, it is apparent that the present invention is not limited to the details of the above exemplary embodiments, and the present invention may be implemented with other embodiments without departing from the spirit or basic features of the present invention. Thus, in any way, the embodiments should be regarded as exemplary, not limitative; the scope of the present invention is limited by the appended claims instead of the above description, and all variations intended to fall into the meaning and scope of equivalent elements of the claims should be covered within the present invention. No reference signs in the claims should be regarded as limiting of the involved claims. Besides, it is apparent that the term "comprise" does not exclude other units or steps, and singularity does not exclude plurality. A plurality of units or modules stated in a system claim may also be implemented by a single unit or module through software or hardware. Terms such as the first and the second are used to indicate names, but do not indicate any particular sequence.

What is claimed is:

1. A charging session termination decision device for determining to terminate a charging session, wherein the charging session termination decision device comprises:
   a request receiving module configured to receive a decision request for termination of the charging processing of the current always on IP connectivity session from a charging session termination request device; and
   a rule sending module configured to send information relevant to a termination rule corresponding to the charging session of the current always on IP connectivity session to the initiating device for the charging session, in response to the decision request;
   wherein the termination rule corresponding to the charging session includes any one of the following items:
      terminating the charging session, but keeping the current always on IP connectivity session; and
      terminating the charging session, and re-opening a new charging session when a predetermined re-open condition is satisfied.

2. The charging session termination decision device according to claim 1, wherein the information relevant to the termination rule includes a trigger instruction of the termination rule.

3. The charging session termination decision device according to claim 1, wherein:
   the charging session termination decision device is a Policy and Charging Rules Function (PCRF); and
   the charging session termination request device is a policy and charging enforcement function (PCEF).

4. The charging session termination decision device according to claim 1, wherein the termination rule corresponding to the charging session includes:
   terminating the charging session, but keeping the current always on IP connectivity session.

5. The charging session termination decision device according to claim 1, wherein the termination rule corresponding to the charging session includes:
   terminating the charging session, and re-opening a new charging session when a predetermined re-open condition is satisfied.

6. A first charging session termination request device for determining to terminate a charging session, wherein the first charging session termination request device comprises:
   a first requesting module configured to request a charging system to terminate a charging session regarding the current always on IP connectivity session when a first predetermined termination condition regarding the charging processing is satisfied;
   wherein the first requesting module comprises:
   a decision requesting unit for sending a decision request for terminating the charging processing of the current always on IP connectivity session to a charging session termination decision device when the first predetermined termination condition regarding the charging processing is satisfied;
   wherein the first requesting module is further configured to:
   request the charging system to terminate the charging session based on a termination rule corresponding to the charging session when the first predetermined termination condition regarding the charging processing is satisfied; and
   wherein the termination rule corresponding to the charging session includes any one of the following items:
      terminating the charging session, but keeping the current always on IP connectivity session; and
      terminating the charging session, and re-opening a new charging session when a predetermined re-open condition is satisfied.

7. The first charging session termination request device according to claim 6, wherein the first requesting module comprises:
   a rule receiving unit for receiving information relevant to a termination rule corresponding to the charging session, wherein the information is sent by the charging session termination decision device in response to the decision request; and
   a termination request unit for determining a corresponding termination rule based on the information relevant to the termination rule corresponding to the charging session, so as to request the charging system to terminate the charging session.

8. A system for determining to terminate a charging session of an always on IP connectivity session, wherein the system comprises a charging session termination decision device comprising a request receiving module configured to receive a decision request for termination of the charging processing of the current always on IP connectivity session from a charging session termination request device and a rule sending module configured to send information relevant to a termination rule corresponding to the charging session of the current always on IP connectivity session to the initiating device for the charging session, in response to the decision request, and a first charging session termination request device according to claim 7.

9. The first charging session termination request device according to claim 6, wherein the first termination condition includes at least any one of the following items:
   no service or traffic within a given time;
   credit quota for data category/data flows allocated by the charging system being run out;
   no active service or no traffic at all within a given time for all monitored data flows by the charging system; and
   traffic congestion being occurred between the charging system and the first charging session termination request device.

10. The first charging session termination request device according to claim 6, wherein the charging system includes any one of the following items:
   Online charging system; and
   Offline charging system.

11. A first charging session termination request device for determining to terminate a charging session, wherein the first charging session termination request device comprises:
   a first requesting module configured to request a charging system to terminate a charging session regarding the current always on IP connectivity session when a first predetermined termination condition regarding the charging processing is satisfied;
   wherein the first requesting module is configured to:
      request the charging system to terminate the charging session based on a termination rule corresponding to the charging session when the first predetermined termination condition regarding the charging processing is satisfied;
   wherein the termination rule corresponding to the charging session includes any one of the following items:
      terminating the charging session, but keeping the current always on IP connectivity session; and terminating the charging session, and re-opening a new charging session when a predetermined re-open condition is satisfied.

12. A second charging session termination request device for assisting in determining to terminate a charging session, wherein the second charging session termination request device comprises:

a second request module configured to send a decision request for terminating the charging processing of the current always on IP connectivity session to a charging session termination decision device when a second predetermined termination condition regarding the charging processing is satisfied;

wherein receipt of the decision request causes the charging session termination decision device to send information relevant to a termination rule corresponding to the charging session of the current always on IP connectivity session to a policy and charging enforcement function (PCEF);

wherein the termination rule corresponding to the charging session includes any one of the following items:
terminating the charging session, but keeping the current always on IP connectivity session; and
terminating the charging session, and re-opening a new charging session when a predetermined re-open condition is satisfied.

13. The second charging session termination request device according to claim 12, wherein the second termination condition includes at least any one of the following items:

no service or traffic within a given time;
credit quota for data category/data flows allocated by the charging system being run out;
no active service or no traffic at all within a given time for all monitored data flows by the charging system; and
traffic congestion being occurred between the charging system and the initiating device for a charging session.

14. A third charging session termination request device for assisting in terminating a charging session, wherein the third charging session termination request device comprises:

a session termination request module configured to request a charging system to terminate a charging session based on information relevant to a termination rule corresponding to the charging session of the current always on IP connectivity session from a charging session termination decision device;

wherein the termination rule corresponding to the charging session includes any one of the following items:
terminating the charging session, but keeping the current always on IP connectivity session; and
terminating the charging session, and re-opening a new charging session when a predetermined re-open condition is satisfied.

15. The third charging session termination request device according to claim 14, wherein the information relevant to the termination rule includes a trigger instruction of the termination rule.

16. A system for determining to terminate a charging session of an always on IP connectivity session, wherein the system comprises a charging session termination decision device comprising a request receiving module configured to receive a decision request for termination of the charging processing of the current always on IP connectivity session from a charging session termination request device and a rule sending module configured to send information relevant to a termination rule corresponding to the charging session of the current always on IP connectivity session to the initiating device for the charging session, in response to the decision request, a second charging session termination request device comprising a second request module configured to send a decision request for terminating the charging processing of the current always on IP connectivity session to a charging session termination decision device when a second predetermined termination condition regarding the charging processing is satisfied, and a third charging session termination request device according to claim 14.

* * * * *